United States Patent [19]  
Torleumke

[11] Patent Number: 4,740,001  
[45] Date of Patent: * Apr. 26, 1988

[54] SPRAG WHEEL

[76] Inventor: Keith R. Torleumke, 515 S. Donovan St., Seattle, Wash. 98108

[*] Notice: The portion of the term of this patent subsequent to Oct. 26, 2003 has been disclaimed.

[21] Appl. No.: 529,023

[22] Filed: Sep. 1, 1983

Related U.S. Application Data

[63] Continuation-in-part of Ser. No. 301,779, Sep. 14, 1981, abandoned.

[51] Int. Cl.⁴ .......................... B62M 1/10; B62M 1/14
[52] U.S. Cl. ............................. 280/11.115; 272/114; 280/205; 280/217; 446/462
[58] Field of Search .................. 280/11.115, 205, 217, 280/11.24, 221, 243, 87.04 R, 78, 207; 46/233, 234, 462, 463, 249, 247, 248; 180/21, 180, 181; 272/114, 132

[56] References Cited

U.S. PATENT DOCUMENTS 2,802,300 8/1957 Rodgers ......................... 280/205 X  
3,306,626 2/1967 Kawada ............................. 280/205  
3,807,085 4/1974 Campbell, Jr. ..................... 46/100  
3,968,593 7/1976 Lin ..................................... 446/462  
4,109,741 8/1978 Gabriel ............................... 180/21  
4,241,931 12/1980 Healy .................................. 280/205  
4,277,912 7/1981 Hsien ................................. 446/233

Primary Examiner—Joseph F. Peters, Jr.  
Assistant Examiner—Mark C. Dukes  
Attorney, Agent, or Firm—Seed and Berry

[57] ABSTRACT

A sprag wheel is a one-wheeled recreational vehicle. Two treads extending on opposite sides of a ground wheel provide a place for the rider to stand. A flywheel concentrically mounted with the treads and ground wheel and housed within the ground wheel provides pitch stability for the rider. That is, the flywheel is coupled to the treads and ground wheel so that the flywheel rotates faster than the ground wheel. The treads are coupled to the flywheel so that the treads will move only by changing the rpm of the flywheel. Thus, a relatively large force is required to move the treads, and, in any event, a force greater than that necessary for the rider to balance on the treads. The sprag wheel of this invention is designed to imitate Thor's wheel in the "B.C." comic strip, so the ground wheel has a relatively large diameter and a moderate width so that a rider may balance on the wheel. Sharp edges of the ground wheel provide improved lateral stability and allow the rider to counteract the natural gyroscopic force generated in the flywheel, when steering the wheel.

Input power means allow a rider to drive the axle and to move the sprag wheel while standing on the treads. In some embodiments, a brake may be used.

27 Claims, 4 Drawing Sheets

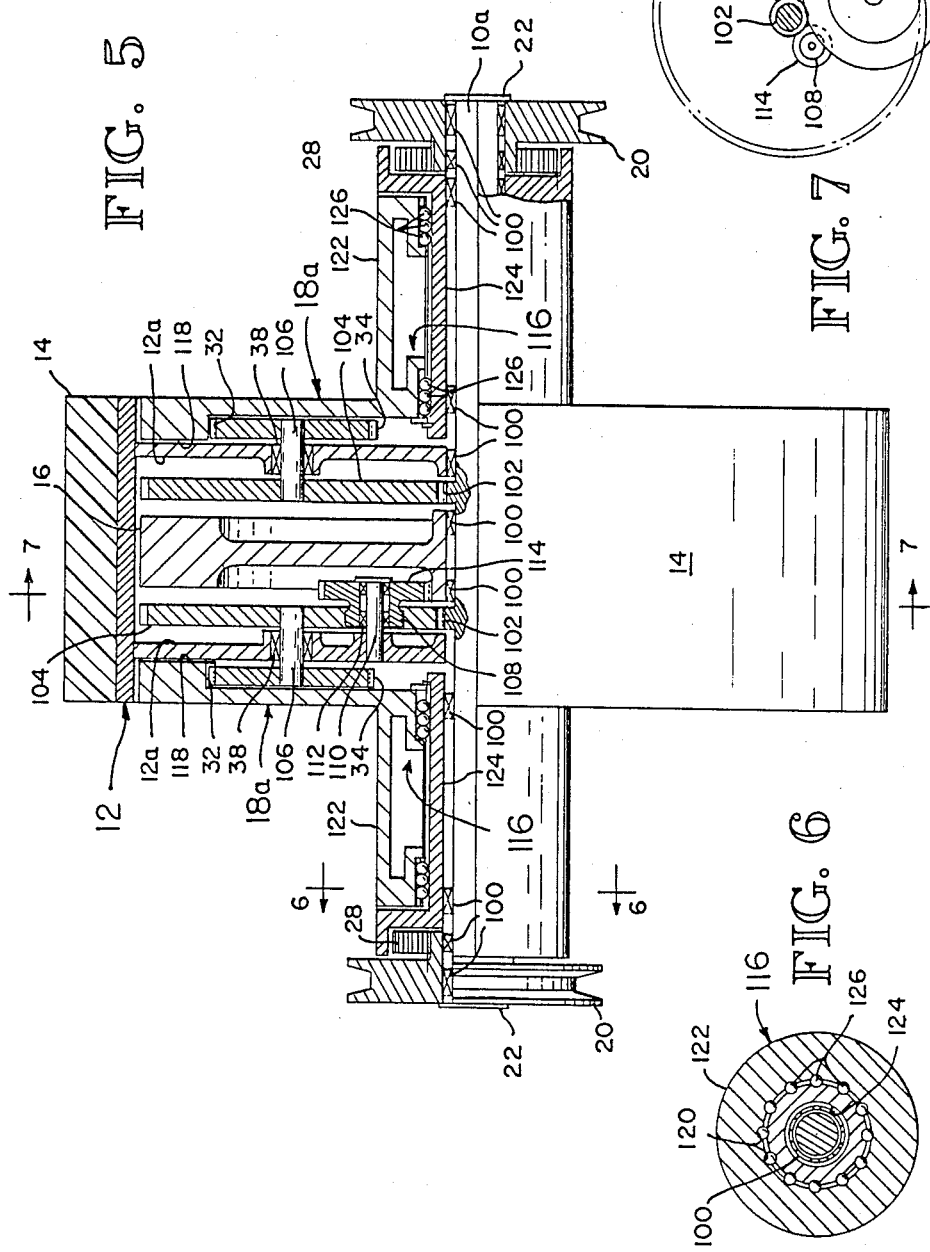

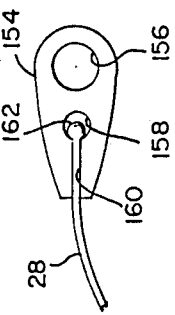
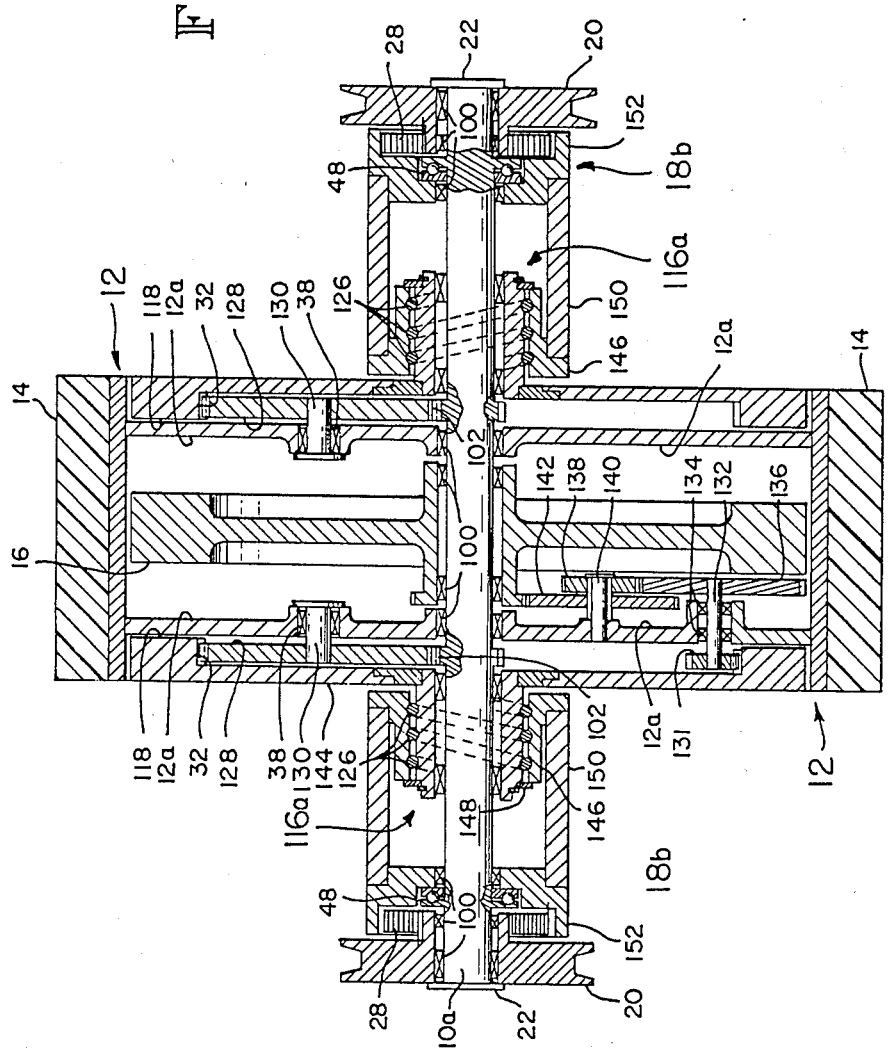

SPRAG WHEEL

REFERENCE TO RELATED APPLICATIONS

This application is a continuation-in-part of application U.S. Ser. No. 301,779, filed Sept. 14, 1981, now abandoned.

TECHNICAL FIELD

A sprag wheel of this invention is a one-wheeled recreational vehicle, having an axle passing through a ground wheel so that a rider may straddle the wheel and ride the wheel by standing on the axle.

BACKGROUND ART

In the "B.C." comic strip, Thor often rides on a single wheel which has a rounded stone ground wheel and a wooden central axle. The sprag wheel of this invention is a practical embodiment of the Thor wheel.

Single-wheeled vehicles have been known for a long time in many different fields. The most familiar, a unicycle mounts a seat to the axle of a wheel and uses pedals for maintaining stability of the rider. Balance is achieved by the rider's being able to oscillate the wheel back and forth through the pedals.

In U.S. Pat. No. 4,241,931, an automobile tire riding vehicle is disclosed. Suitable means are placed within the inside of the tire to roll along the bead when the tire rolls. Power input means are not provided in this vehicle. A rider can only roll down a slightly sloping hill to enjoy his toy rather than being able to ride on the level.

In U.S. Pat. No. 3,306,626, a ball is adapted for riding by the person who stands on plates projecting from the ball. A plurality of one-way clutches allow skittering on the ball in one direction, while the clutches release when moved in the opposite direction. The ball reveals no means for pitch stability and results in a waddling or skittering motion when ridden rather than an imitation of the ride Thor achieves on his wheel.

Single-wheeled toys utilizing flywheels as energy storage devices are shown in U.S. Pat. Nos. 2,802,300; 3,955,429; and 3,621,607.

DISCLOSURE OF INVENTION

The sprag wheel of this invention is a one-wheeled recreational vehicle. A ground wheel is concentrically mounted for rotation on an axle and is coupled to a flywheel. The flywheel is coupled to the axle, is coaxial with the ground wheel, and is mounted within the ground wheel. Two treads are mounted on the axle for rotation coaxially with the axle. One tread is placed on each side of the ground wheel to serve as a platform for one foot of a rider. Means for coupling the flywheel, ground wheel, and treads together require that a change in the rpm of the flywheel be made to move the treads. The coupling also provides that the flywheel turns faster than the ground wheel and that the ground wheel turns more slowly than the axle. The preferred coupling provides dynamic coupling for the vehicle so that at least two of the flywheel, ground wheel, and treads rotate when any one of the three is rotated. That is, when the ground wheel is turned, the coupling between the flywheel, ground wheel, and treads requires that either the flywheel or treads also turn along with the ground wheel. All three of the flywheel, ground wheel, and treads may rotate when one of the three is rotated, but at least one of the other two remaining parts must rotate when a third is rotated to achieve the preferred dynamic coupling for the vehicle.

While in the preferred vehicle, the flywheel is fixed to the axle, any one of the three elements (the flywheel, the ground wheel, or the treads) may be fixed to the axle. That is, the flywheel may be made free to rotate on the axle while the ground wheel is fixed to the axle. Alternatively, the flywheel and ground wheel may be free to rotate on the axle while the treads are fixed thereto. For manually driven sprag wheels, it is preferred that the flywheel be fixed to the axle. In some circumstances, the treads, groundwheel and flywheel may all be free to rotate on the axle.

The flywheel provides pitch stability for the sprag wheel of this invention. That is, the flywheel rotates faster than the ground wheel and thus provides a dynamic reaction mass for the treads. For the treads to turn, the force applied to the treads must be sufficient to change the rpm of the flywheel. Therefore, stability is provided for fore and aft roll by a person standing on the treads. The revolution of the flywheel helps to maintain the absolute position of the treads in a preferred coupling of this invention.

The ground wheel is preferably of moderate width to provide sufficient ground contact that a rider may easily balance upon the axles. Furthermore, the ground wheel preferably has sharp edges to provide lateral stability for the rider. Sharp edges are desirable because the gyroscopic action of the revolving flywheel needs to have some counter force provided in order to maintain a straight line direction for the sprag wheel. Without sharp edges, the wheel will tend to roll or to yaw. Under the gyroscopic action, the sprag wheel will assume a crazy course rather than an ordered course of travel. A preferred ground wheel has a width of approximately three to five inches.

To drive the sprag wheel, suitable input power means are coupled to the axle. Because pitch stability is the primary function of the flywheel, the gear ratio between the ground wheel and flywheel need not be as high as in an energy storage flywheel. For a wheel of typical recreational size, the gear ratio need not exceed 1:20 for the ground wheel and flywheel. Preferably, the gear ratio between the ground wheel and the flywheel is between about 1:7.8 to 1:12.0. In this range, the flywheel is easily revolved by suitable input power means and provides sufficient dynamic reaction mass to provide the necessary pitch stability so that riding of the wheel is possible.

A preferred power input means includes a cable spool mounted to the axle to allow driving of the axle in one direction and recoiling of the spool in the opposite direction. As a cable is unwound from the cable spool, the cable spool is turned. After completely withdrawing the cable, a suitable clutch and spring allow the cable to be rewound onto the cable spool.

The preferred means for coupling the flywheel, ground wheel, and treads uses a planetary gear system, which includes a ring gear coaxially mounted on each tread, and planet gears mounted to orbit the axle and to drive the ground wheel. The planet gears are driven from a pinion on the flywheel.

Brakes may be included if the sprag wheel has the ground wheel, flywheel and treads free to rotate on the axle, and are particularly desirable if the flywheel rotates the opposite direction from the ground wheel.

BRIEF DESCRIPTION OF THE DRAWING

FIG. 5 is a schematic cross-sectional view of another preferred embodiment of a sprag wheel including a brake.

FIG. 6 is a sectional elevation of a brake spline for the sprag wheel of FIG. 5, taken along line 6—6 of FIG. 5.

FIG. 7 is a sectional elevation of the gear mechanism of the sprag wheel of FIG. 5, taken along line 7—7 of FIG. 5.

FIG. 8 is a schematic cross-sectional view of another embodiment of a sprag wheel including a brake.

FIG. 9 is a side elevation of a preferred spring-retaining clip used to hold a rewind spring of the sprag wheel.

BEST MODE FOR CARRYING OUT THE INVENTION

Figure 1:
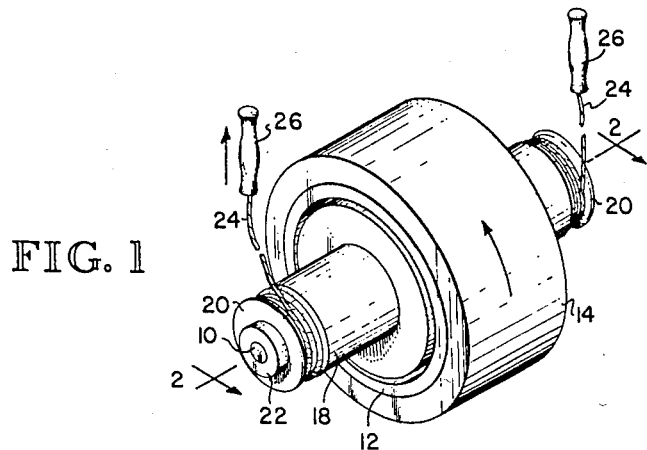
FIG. 1 is an isometric view of a sprag wheel of this invention.

The sprag wheel of the present invention is designed to imitate as nearly as possible the wheel used by Thor in the "B.C." comic strip. A central axle 10 extends through a ground wheel 12 having a rubber outside portion 14 to contact the ground. The ground wheel 12 is of moderate width to provide sufficient balancing stability for a rider. Also, the outer rubber portion 14 is provided with a relatively flat, radial surface and sharp edges. Sharp edges are necessary to counteract the gyroscopic effect of an internal flywheel 16 on the axle 10 and housed within the ground wheel 12. Sharp edges provide bearing surfaces for steering the wheel. Mounted concentrically with axle 10 and ground wheel 12 are two treads 18 on opposite sides of the ground wheel 12. A rider stands on the treads 18 straddling the ground wheel 12. Cable spools 20 are mounted on the axle to rotate freely in one direction, but to be coupled to the axle 10 in the other direction. These cable spools 20 are held on the axle 10 with suitable means, such as lock washers 22. Cables 24 are wrapped around the cable spools 20 and end in handles 26. When a rider stands on the treads 18, the rider holds the handles 26 and pulls the cables 24 upwardly to unwrap them from the cable spools 20 and simultaneously to drive the axle 10. Spring means 28, such as a common clock spring of spiral wound metal, are positioned so that the cable may be recoiled onto the cable spool 20 when tension is released from the upward pulling. To allow the revolving of the cable spool freely in one direction while requiring coupled rotation of the cable spool 20 and axle 10 in the other direction, suitable means such as a Torrington roller clutch bearing 30, are coupled between the cable spool 20 and axle 10. Preferably, the roller clutch bearing 30 is press fit into the cable spool 20.

Figure 2:
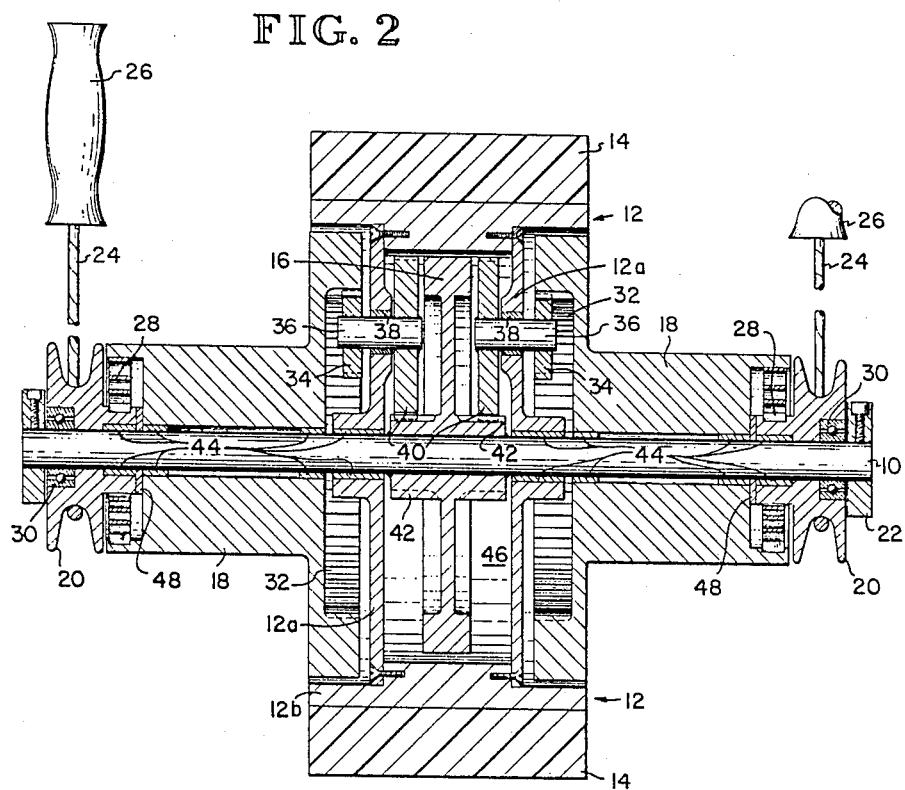
FIG. 2 is a cross-sectional view taken along line 2—2 of FIG. 1.

As shown in FIG. 2, the flywheel 16 is fixed to the axle 10 by suitable means, such as by "LOCTITE" (a trademark of the Loctite Corporation) gluing of the flywheel to the axle, by keyways, or by welding. It is not essential that the flywheel 16 always be attached to the axle 10. Instead, either the ground wheel 12 or the treads 18 may be attached to the axle 10 while the other two elements are free to rotate about the axle 10, or all three elements may be free to rotate on the axle 10.

Suitable coupling means operatively connect the flywheel 16, ground wheel 12, and treads 18 together. As shown in FIG. 2, a preferred means for coupling includes a ring gear 32 formed within the treads 18 and meshing with a first planet gear 34 keyed to a shaft 36. A second planet gear 40, which meshes with a pinion 42 formed into the flywheel 16, is also keyed to the shaft 36. The shaft 36 passes through a hole in the ground wheel 12 and revolves in the hole in suitable bearings 38. Thus, in operation, as the axle 10 revolves, the flywheel 16 turns. The pinion 42 of the flywheel 16 forces planet gear 40 to revolve. Simultaneously, the revolving of shaft 36 moves planet gear 34 around ring gear 32 of the treads 18 to maintain the relative position of the treads constant. Hence, as the planet gear 34 revolves on the ring gear 32, the shaft 36 orbits around the axle 10 and drives the ground wheel 12. In this way, a rider standing on the treads 18 may remain in relatively constant position while the axle 10, the flywheel 16 and the ground wheel 12 rotate. For the treads to move in either direction around the axle 10, the flywheel 16 must have its rpm changed by sufficient input force to accelerate or decelerate the flywheel 16 through the planetary gear system. Therefore, the system provides inherent pitch stability; i.e., the coupling of the treads 18 with the flywheel 16 requires that a force be applied to move the treads. In other words, the flywheel 16 provides a dynamic reaction mass to the sprag wheel so that a rider standing on the treads 18 may balance himself by exerting a counterforce against the reaction mass. Without the dynamic reaction mass, it would be impossible to ride a wheel of the design of Thor's wheel. If the axle 10 and treads 18 were directly coupled to the ground wheel 12, the rider would have to move his feet (as in log birling) much too rapidly to stay on the vehicle. If the treads 18 were uncoupled from the ground wheel 12, however, the rider would not be able to balance because the treads 18 would tend to rotate around the axle under even the smallest of forces of imbalance.

To ensure free rotation of the various parts about the axle 10, suitable bearings 44 are provided between cable spool 20 and axle 10, between the treads 18 and axle 10, and between the ground wheel 12 and axle 10.

To facilitate construction of the sprag wheel of this invention, the ground wheel 12 is generally made from three parts (FIG. 2). Two faceplates 12a are placed on the axle 10 on opposite sides of the flywheel 16, and are connected to a rim 12b with screws to provide a cavity 46 concealed within the ground wheel 12. The flywheel 16 revolves in the cavity 46. The holes for the orbiting shaft 36 pass through the faceplates 12a.

To make the sprag wheel even more similar to that of Thor, the outer diameter of a flange on the treads 18 fits into a cutout portion of the rim 12b, thereby concealing the coupling means within the wheel. The lateral edges of the rim and flange are, then, essentially coplanar.

Thrust bearings 48 may be placed between parts which otherwise are capable of sliding along the axle 10. These thrust bearings 48 (shown, for example, only between the cable spool 20 and treads 18 in FIG. 2) absorb energy from sliding parts and reduce wear and abrasion of the parts as they rotate with respect to one another.

While the flywheel 16 provides pitch stability through its rotating mass, it is important that the flywheel 16 not provide too great an energy storage capacity for the sprag wheel. By design, the flywheel 16 rotates more rapidly than the ground wheel 12 through the gearing system. (If the flywheel 16 rotated twice as fast as the ground wheel 12, the gear ratio between the ground wheel 12 and flywheel 16 would be 1:2.) Preferably, the gear ratio between the ground wheel and flywheel is between about 1:7.8 to 1:12.0. The gear ratio between the ground wheel and flywheel should not exceed about 1:20 for a recreational sprag wheel. Above this maximum gear ratio, excessive gyroscopic action makes the wheel difficult to steer. Furthermore, above this gear ratio, the flywheel 16 tends to store too much energy, the sprag wheel becomes an inertial motor, and control of the wheel is lost. If speed rather than amusement is desired, however, it is possible to use a gear ratio higher than the 1:20 which is preferred, although care should be taken in constructing such a device due to the limitations just explained.

Figure 3:
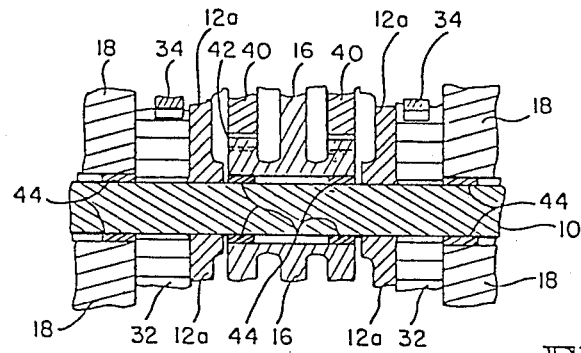
FIG. 3 is a schematic cross-sectional view of the center of a sprag wheel, similar to FIG. 2, showing the ground wheel fixed to the axle 10.
Figure 4:
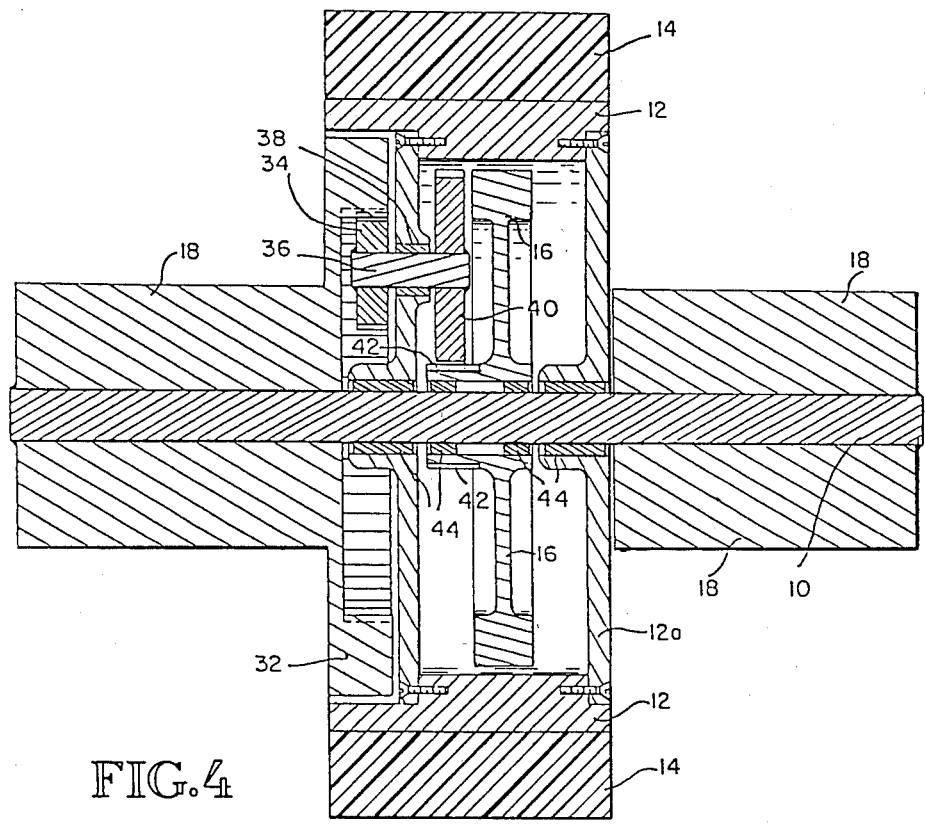
FIG. 4 is a schematic cross-sectional view of a sprag wheel, similar to FIG. 2, showing the treads 18 fixed to the axle 10.

Of the three elements (the flywheel 16, the treads 18, or the ground wheel 12) which may be individually fixed to the axle in the sprag wheel embodiments of FIGS. 2–4, it is least desirable to fix the treads 18 to the axle 10 because of the difficulty of then incorporating driving means into the sprag wheel. A cable spool 20 cannot be used in this embodiment (FIG. 4). If the ground wheel 12 is fixed to the axle 10 (FIG. 3), the preferred means for coupling may produce an unfavorable rpm ratio between the cable spools 20 and the axle 10. Therefore, it is difficult to provide adequate input force to the ground wheel 12. The preferred design of a fixed flywheel 16 and planetary gear train, however, gears down between the input power means and the ground wheel 12 for greater enjoyment.

Friction is a major problem to overcome in providing an operable sprag wheel. Therefore, it is desirable to use precision roller bearings 44 or other suitable bearings to reduce the friction between the axle 10 and those parts which are designed to rotate freely about the axle 10. While a device may operate without the use of high-tolerance bearings, efficiency is greatly enhanced with roller bearings. Roller thrust bearings 48 between sliding parts also reduce friction and wear, as was previously explained.

While a planetary gear system has been shown to couple the treads 18, flywheel 16, and ground wheel 12, other suitable means may be used. In particular, the planetary gear system may be replaced with a sprocket and chain system rather than the intermeshing of planet gears and ring gears. In fact, in some situations, it may be preferable to employ a sprocket and chain assembly because the sprocket and chain will provide greater lateral tolerance between parts. That is, the lateral alignment of parts is not as critical with a sprocket and chain. A sprocket and chain could speed assembly of the sprag wheel. The planetary gear system shown is highly preferred, however, because of the high reliability in the coupling which it provides. For better operation, the planetary gear system should be balanced. Staggering the systems 180° apart around the axle 10 may be desirable to achieve this balance. Otherwise, the face plates 12a probably need to be unbalanced to account for the weight of the gear system.

Although a cable spool 20 and cable retraction means 24 and 26 are shown as the preferred power input means, it may be possible to incorporate a small electric motor into the treads 18 to drive the axle 10 electromechanically. In this case, a rigid or semirigid control means would extend upwardly from the axle 10 similar to the cables 24 that are shown in FIG. 1. Standing on the treads 18, the rider would control the speed of the motor with the controller and would thereby control the speed of the axle 10, ground wheel 12, or flywheel 16.

To reduce breakage of the cables 24 through repeated flexing at the handles 26, each handle 26 preferably includes a flexible joint, such as a double universal joint, between its lower end and the cable 24. Each handle 26 may also include tapered roller bearings and axle to allow the cable to revolve in the handle to eliminate natural twisting and to prevent snarling, which otherwise occurs when a cable 24 is wound around a spool 20.

A non-marring plastic scuff guard 50 (as shown in FIG. 2) may be attached at each end of the axle 10 of the sprag wheel to each cable spool 20. This scuff guard 50 reduces fraying of the cable by smoothing the edge of the cable spool 20, guides the cable to insure better rewinding, reduces the angle to which the wheel tips when unbalanced, and provides a soft cushion for the end of the axle 10 to reduce marring of floors when the sprag wheel tips.

A fully dynamic sprag wheel allows a groundwheel 12, flywheel 16, and treads 18 to be free to rotate about the axle 10. An additional gear is usually added to the planetary gear system to link the elements and to rotate the flywheel 16 in the opposite rotational sense from the groundwheel 12. This version of the sprag wheel may include a brake.

As shown schematically in FIG. 5, the fully dynamic sprag wheel is analogous to the embodiments of FIGS. 2–4 except for the gear system and brake. All the elements are free to rotate about the axle 10a on suitable bearings 100.

Pinions 102 on the axle 10a drive gears 104. A common shaft 106 in the center of the gear 104 passes through a hole in the faceplate 12a and revolves in the hole in suitable bearings 38. A planet gear 34 (as in FIG. 2) is keyed to the common shaft 106 and meshes with a ring gear 32 (FIG. 7) molded into the treads 18a.

The gear 104 on one side of the flywheel 16 drives a second planet gear 108 mounted on a shaft 110 projecting from the faceplate 12a. The gear 108 is free to revolve on the shaft 110 through suitable bearings 112, and is coupled through a drive gear 114, to the pinion 42 on the flywheel 16. Thus, when the axle 10a turns, the ground wheel 12 is driven in one rotational sense by the common shafts 106 which orbit the axle 10a, as the planet gear 34 walks around the ring gear 32 of the treads 18a. The flywheel 16 is simultaneously driven in the opposite rotational sense through the other planet gear 108 in the gear system. The sprag wheel is fully dynamic since none of the elements is fixed to the axle 10a.

Because the flywheel 16 and ground wheel 12 revolve in opposite directions, a brake may be incorporated into the wheel. This brake includes a roller spline means 116 to allow movement of a facing surface 118 of the treads 18a against the faceplate 12a of the ground wheel 12 about the axle 10a. The roller spline means 116 includes a plurality of splines 120 machined into a footing 122 and base 124 (FIG. 6), of the treads 18a to receive ball bearings 126. The bearings 126 allow lateral movement of the footing 122 relative to the base 124 on the axle 10a so that the facing surface 118 abuts the ground wheel 12. Brake linings may be used, if desired.

An alternative dynamic sprag wheel is shown in FIG. 8 with an alternate brake, having a roller spline means 116a. Here, a pinion 102 on the axle 10a drives a gear 128 which also meshes with the ring gear 32 of the treads. As the axle 10a drives the gear 128, it walks around the ring gear 32 to move its center shaft 130 around the axle 10a. The center shaft 130 passes through bearings 38 in a hole through the faceplate 12a of the ground wheel 12, and directly drives the ground wheel 12 at a higher speed than the other embodiments because speed reduction gears have been eliminated. The ground wheel 12 can be narrower in this embodiment to increase its maneuverability, but the increase in maneuverability usually is outweighed by the disadvantage of increased input force, which is required to drive the ground wheel 12.

To drive the flywheel 16, a planet gear 131 meshes with the ring gear 32 to turn shaft 132 in bearings 134 through the faceplate 12a, and, in turn, to turn gear 136 on the inner end of the shaft 132. This inner gear 136 meshes with a second planet gear 138 on a stub shaft 140 affixed to the faceplate 12a. The second planet gear turns a larger outer cog 142 which meshes with a pinion 42 on the flywheel 16 to drive the flywheel.

The roller spline means 116a to provide braking uses a base 144 having a bearing surface 118 to frictionally abut the faceplate 12a of the ground wheel 12 when the tread is birled to move base 144 laterally inwardly. The base 144 revolves on the axle 10a on needle bearings 147 which allow axial motion. A plurality of ball bearings 126 in a helical spline of a ball screw drive mechanism allows the base 144 to move inwardly. The spline has a right handed helix on the right side and a left handed helix on the left side. The bearings 126 are held in the splines with an outer member 146 and a washer 148 seated in a groove of the base 144. A footing 150 and endpiece 152 complete the tread 18b. The brake is applied by rotating the tread 18b in one direction. A brake only need be placed in one of the two treads, although use of two provides longer life and better wheel balance. A thrust bearing 48 bears the reaction thrust when the brakes are applied.

As shown in FIG. 9, the rewind springs 28 are connected to the spool 20 with a retaining clip 154 having an opening 156 to allow free rotation on a pin projecting from the spool 20 and a hole 158 and slot 160 to receive the end 162 of the spring 28. This clip 154 greatly improves the life of the spring 28 since it reduces the stress on the spring 28 when it is fully stretched. Because the springs 28 are repeatedly wound and unwound when riding the wheel, it is important to protect the springs 28 to the greatest extent possible.

While preferred embodiments have been shown and described, those skilled in the art will recognize alternatives and modifications which do not depart from the inventive concept. Therefore, the claims should be construed liberally to protect the invention, and should only be limited as is reasonably necessary in light of this description and the relevant prior art.

I claim:

1. A one-wheeled recreational vehicle for riding by a person, comprising:
   (a) an axle;
   (b) a ground wheel concentrically mounted on the axle;
   (c) a flywheel on the axle, coaxial with the ground wheel, and mounted within the ground wheel;
   (d) two treads mounted coaxially on the axle, one tread on each side of the ground wheel;
   (e) means for coupling together the flywheel, ground wheel, and treads so that movement of the treads requires a change in the rpm of the flywheel and so that the flywheel turns faster than the ground wheel; and
   (f) input power means coupled to the axle to drive the vehicle while developing pitch stability through the reaction of the flywheel.

2. The vehicle of claim 1 wherein one element selected from the flywheel, the ground wheel, and the treads is fixed to the axle.

3. The vehicle of claim 1, wherein the means for coupling provides dynamic coupling for the vehicle so that at least two of the flywheel, ground wheel, and treads rotates when any one of the three is rotated.

4. The vehicle of claim 3 wherein the means for coupling includes a dual drive train, one drive train being associated with each tread.

5. The vehicle of claim 2 wherein the means for coupling includes a ring gear on each tread, a first planet gear meshing with the ring gear, a second planet gear on a common shaft coupled to the first planet gear, and a pinion on the flywheel meshing with the second planet gear, wherein the shaft passes through the ground wheel to drive the ground wheel when the shaft orbits the axle, and wherein only the flywheel is fixed to the axle.

6. The vehicle of claim 1 wherein the gear ratio between the ground wheel and flywheel is no greater than about 1:20.

7. The vehicle of claim 1 wherein the gear ratio between the ground wheel and flywheel is between about 1:7.8 and 1:12.0.

8. The vehicle of claim 1 wherein the input power means includes a cable spool mounted to the axle to allow driving of the axle in one direction by withdrawing a cable from the spool and to allow recoiling of the cable by revolving the spool in the opposite direction.

9. The vehicle of claim 8 wherein the input power means further includes a roller clutch bearing in the cable spool to allow the desired rotation.

10. The vehicle of claim 9 wherein the input power means further includes a recoil spring to supply recoil force to the cable spool for rewinding the cable.

11. The vehicle of claim 1 wherein the ground wheel is driven more slowly than the axle.

12. The vehicle of claim 1, further including a scuff guard at each end of the axle.

13. The vehicle of claim 3 wherein the treads are free to rotate on the axle and wherein the input power means includes a cable spool mounted to the axle to allow driving the axle in one direction by withdrawing a cable from the spool and to allow recoiling of the cable by revolving the spool in the opposite direction.

14. The vehicle of claim 13 wherein the means for coupling includes a ring gear on each tread, a first planet gear meshing with the ring gear, a second planet gear on a common shaft coupled to the first planet gear, and a pinion on the flywheel meshing with the second planet gear, wherein the shaft passes through the ground wheel to drive the ground wheel when the shaft orbits the axle.

15. The vehicle of claim 3 wherein the input power means includes a cable spool mounted to the axle to allow driving of the axle in one direction by withdrawing a cable from the spool and to allow recoiling of the cable by revolving the spool in the opposite direction.

16. The vehicle of claim 3 wherein the ground wheel is driven more slowly than the axle.

17. The vehicle of claim 3 wherein (1) the means for coupling includes a ring gear on each tread, a first planet gear meshing with the ring gear, a second planet gear on a common shaft coupled to the first planet gear, and a pinion on the flywheel meshing with the second planet gear, (2) the shaft passes through the ground wheel to drive the ground wheel when the shaft orbits the axle, (3) the input power means includes a cable spool mounted to the axle to allow driving of the axle in one direction by withdrawing a cable from the spool and to allow recoiling of the cable by revolving the spool in the opposite direction, and (4) the ground wheel is driven more slowly than the axle.

18. A one-wheeled recreational vehicle for riding by a person, comprising:
   (a) an axle;
   (b) a ground wheel concentrically mounted for rotation on the axle;
   (c) a flywheel on the axle, coaxial with the ground wheel, and mounted within the ground wheel;
   (d) two treads mounted for rotation coaxially on the axle, one tread on each side of the ground wheel; and
   (e) means for coupling together the flywheel, ground wheel, treads, and axle so that movement of the treads requires a change in the rpm of the flywheel and so that the flywheel turns faster than the ground wheel.

19. The vehicle of claim 18 wherein the flywheel and ground wheel revolve in opposite directions.

20. The vehicle of claim 18 further comprising a brake coupled between the treads and ground wheel.

21. The vehicle of claim 20 wherein the brake includes a roller spline means for allowing at least one tread to move laterally on the axle so that the tread frictionally engages the ground wheel.

22. The vehicle of claim 21 wherein the roller spline means has a helically threaded spline to receive ball bearings.

23. The vehicle of claim 21 wherein the roller spline means has a plurality of splines to receive ball bearings, each spline being substantially parallel to the axle.

24. The vehicle of claim 19 further comprising a brake coupled between the treads and ground wheel.

25. The vehicle of claim 1 further comprising a brake coupled between the treads and ground wheel.

26. The vehicle of claim 25 wherein the brake includes a roller spline means for allowing at least one tread to move laterally on the axle so that the tread frictionally engages the ground wheel.

27. The vehicle of claim 18 wherein all three of the ground wheel, flywheel, and treads are free to rotate on the axle.

* * * * *